United States Patent
Slattery

(10) Patent No.: US 11,710,331 B2
(45) Date of Patent: Jul. 25, 2023

(54) SYSTEMS AND METHODS FOR SEPARATING LIGATURE CHARACTERS IN DIGITIZED DOCUMENT IMAGES

(71) Applicant: Capital One Services, LLC, McLean, VA (US)

(72) Inventor: Douglas Slattery, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 189 days.

(21) Appl. No.: 16/953,099

(22) Filed: Nov. 19, 2020

(65) Prior Publication Data

US 2021/0073567 A1    Mar. 11, 2021

Related U.S. Application Data

(63) Continuation of application No. 16/357,878, filed on Mar. 19, 2019, now Pat. No. 10,878,271.

(51) Int. Cl.
   *G06V 30/414*    (2022.01)
   *G06V 30/148*    (2022.01)
   *G06V 30/10*    (2022.01)

(52) U.S. Cl.
   CPC ......... *G06V 30/414* (2022.01); *G06V 30/153* (2022.01); *G06V 30/155* (2022.01); *G06V 30/158* (2022.01); *G06V 30/10* (2022.01)

(58) Field of Classification Search
   None
   See application file for complete search history.

(56) References Cited

U.S. PATENT DOCUMENTS

| | | | |
|---|---|---|---|
| 3,587,046 A | 6/1971 | Tanaka et al. |
| 5,412,771 A | 5/1995 | Fenwick |
| 5,825,923 A | 10/1998 | Thompson et al. |
| 6,005,976 A | 12/1999 | Naoi et al. |
| 2009/0245654 A1 | 10/2009 | Xing et al. |
| 2016/0328366 A1 | 10/2016 | Elarian |
| 2017/0228607 A1 | 8/2017 | Elarian |

FOREIGN PATENT DOCUMENTS

WO    2005/001675    1/2005

OTHER PUBLICATIONS

Q.U.A. Akram and S. Hussain, "Improving Urdu Recognition Using Character-Based Artistic Features of Nastalique Calligraphy," in IEEE Access, vol. 7, pp. 8495-8507, 2019, doi: 10.1109/ACCESS.2018.2887103.

*Primary Examiner* — Jiangeng Sun
(74) *Attorney, Agent, or Firm* — Hunton Andrews Kurth LLP

(57) ABSTRACT

Embodiments disclosed herein provide for systems and methods of separating characters associated with ligatures in digitized documents. The systems and methods provide for a ligature detection engine configured to identify the ligatures, and a ligature processing engine configured to identify and remove the glyphs attaching the separate characters forming the ligature.

20 Claims, 4 Drawing Sheets

Image Processor
10

System 100

Image Processor
10

200

200a

200b

SYSTEMS AND METHODS FOR SEPARATING LIGATURE CHARACTERS IN DIGITIZED DOCUMENT IMAGES

CROSS REFERENCE TO RELATED APPLICATION

This application is a Continuation of U.S. application Ser. No. 16/357,878, filed Mar. 19, 2019, the complete disclosure of which is incorporated herein by reference.

TECHNICAL FIELD

The present application relates to systems and methods for separating characters associated with ligatures in digitized document images.

BACKGROUND

Ligatures generally refer to characters consisting of two or more joined letters or graphemes. Although ligatures can be utilized as design choices, they're often the result of image processing errors for digitized documents. For example, if a digitized document image is of low quality, it may be difficult for the optical character recognition (OCR) processing the image to distinguish a ligature from the characters it is composed of. As such, the OCR engine can fail to convert the low-quality images containing the ligatures into accurate textual representations, e.g., American Standard Code for Information Interchange (ASCII) text. Currently, inefficient techniques such as connected component analysis, segmentation, and ligature recognition are utilized to identify and separate the characters associated with ligatures.

Accordingly, there is a need to efficiently identify and separate the characters associated with ligatures.

DESCRIPTION OF EMBODIMENTS

Figure 1A:
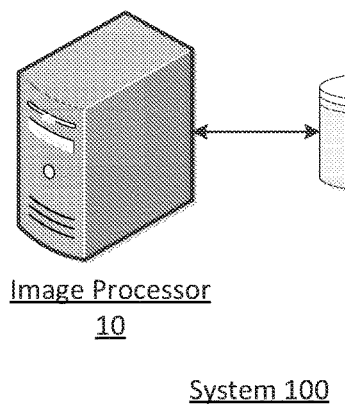
FIG. 1A illustrates an example embodiment of a system for separating characters associated with ligatures in digitized document images.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide a system and method for separating characters including ligatures. The systems and methods herein address at least one of the problems discussed above.

According to an embodiment, a system for separating characters associated with ligatures in digitized document images includes: (i) a ligature detection engine, wherein the ligature detection engine is configured to: receive at least one digitized document image including a plurality of characters; determine which of the plurality of characters in the at least one digitized document image are associated with ligatures; and generate a contour around each of the ligatures, wherein the contour includes a pixelated version of the ligature, wherein pixels associated with glyphs of the ligature are darkened; and (ii) a ligature processing engine, wherein the ligature processing engine is configured to: scan each column of the contour; determine, for each scanned column including at least one darkened pixel, a height of a respective glyph associated with the at least one darkened pixel; identify a pinch point for the ligature based on a comparison between a plurality of adjacent scanned columns including at least one darkened pixel; remove the glyph associated with the pinch point; and separate the characters associated with the ligature based on the removed glyph.

According to an embodiment, a method for separating characters associated with ligatures in digitized document images includes: receiving, with a processor, at least one digitized document image including a plurality of characters; determining, with the processor, which of the plurality of characters in the at least one digitized document image are associated with ligatures; generating, with the processor, a contour around each of the ligatures, wherein the contour includes a pixelated version of the ligature, wherein pixels associated with glyphs of the ligature are darkened; and scanning, with the processor, each column of the contour; determining, with the processor, for each scanned column including at least one darkened pixel, a height of a respective glyph associated with the at least one darkened pixel; identifying, with the processor, a pinch point for the ligature based on a comparison between a plurality of adjacent scanned columns including at least one darkened pixel; removing, with the processor, the glyph associated with the pinch point; and separating, with the processor, the characters associated with the ligature based on the removed glyph.

According to an embodiment, a system for separating characters associated with ligatures in digitized document images includes: a processor, wherein the processor is configured to: receive a contour including a ligature, wherein the ligature is pixelated, wherein pixels associated with the ligature are darkened; scan each column of the contour; determine, for each scanned column including at least one darkened pixel, a height of a respective glyph associated with the at least one darkened pixel; identify a pinch point for the ligature based on a comparison between a plurality of adjacent scanned columns including at least one darkened pixel; remove the glyph associated with the pinch point; and separate the characters associated with the ligature based on the removed glyph.

FIG. 1A illustrates an example embodiment of a system for separating characters associated with ligatures in digitized document images. As depicted in the figure, a system 100 includes an image processor 10 and a memory database 20. In an embodiment, the image processor 10 is suitable for the execution of a computer program and may include, by way of example, both general and special purpose microprocessors, and any one or more processors of any kind of digital computer. In particular, the image processor 10 may execute a computer program directed to image processing. For example, according to an embodiment, the image processor 10 may be configured to: receive a contour including a ligature, wherein the ligature is pixelated and the pixels associated with the ligature are darkened; scan each column of the contour; determine, for each scanned column including at least one darkened pixel, a height of a respective glyph associated with the at least one darkened pixel; identify a pinch point (i.e., glyph attaching the separate characters forming the ligature) for the ligature based on a comparison between a plurality of adjacent scanned columns including at least one darkened pixel; remove the glyph associated with the pinch point; separate the characters associated with the ligature based on the removed glyph; and verify the accuracy of the separated characters. Further, in an embodiment, the memory database 20 may be utilized to store computer instructions and data including all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Further, the memory database 20 may also interact with the image processor 10. For example, the image processor 10 may receive instructions and data from the memory database 20. In an embodiment, the image processor 10 and the memory database 20 may be supplemented by, or incorporated in, special purpose logic circuitry. However, in another embodiment, the image processor 10 and the memory database 20 may be located in separate, distinct devices. For example, the image processor 10 and the memory database 20 may be implemented in a computing system that includes a back-end component, e.g., a data server, or that includes a middleware component, e.g., an application server, or that includes a front-end component, e.g., a client computer having a graphical user interface or a Web browser through which a user can interact with an implementation, or any combination of such back-end, middleware, or front-end components.

Figure 1B:
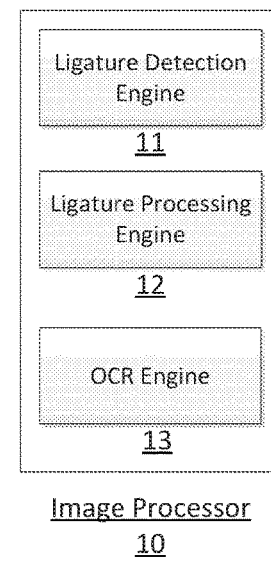
FIG. 1B illustrates an example embodiment of the image processor depicted in FIG. 1A.

FIG. 1B illustrates an example embodiment of the image processor depicted in FIG. 1A. In particular, as depicted in the figure, the image processor 10 includes a ligature detection engine 11, a ligature processing engine 12, and an OCR engine 13. According to an embodiment, the ligature detection engine 11 is configured to: receive at least one digitized document image including a plurality of characters; determine which of the plurality of characters in the at least one digitized document image are associated with ligatures; and generate a contour around each of the ligatures, wherein the contour includes a pixelated version of the ligature and the pixels associated with glyphs of the ligature are darkened. Further, the contour may include (i) a pixel height based, at least in part, on a height of the ligature and (ii) a pixel width based, at least in part, on a width of the ligature. According to an embodiment, a ligature can be detected by the ligature detection engine 11 upon determining a width of a contour in pixels exceeds what a maximum wide character in a proportional font in pixels would be. For example, the letter "W" is wider than the letter "1", so contours wider than "W" with the addition of inter-character spacing, plus a narrow character width, further qualifies a ligature. Further, the ligature detection engine 11 may also be configured to convert the at least one digitized document image from color into monochrome. Further, according to an embodiment, the ligature processing engine 12 is configured to: scan each column of the contour; determine, for each scanned column including at least one darkened pixel, a height of a respective glyph associated with the at least one darkened pixel; identify a pinch point for the ligature based on a comparison between a plurality of adjacent scanned columns including at least one darkened pixel; remove the glyph associated with the pinch point; and separate the characters associated with the ligature based on the removed glyph (i.e., slicing the contour vertically at the pinch point and separating the contour into separate contours). Further, according to an embodiment, the columns may be scanned from either left to right or right to left. Further, the height of a respective glyph may be determined based on (i) a first distance from a top of the contour to a topmost darkened pixel in the column and (ii) a second distance from a bottom of the contour to a bottommost darkened pixel in the column, wherein the first distance is determined based on a first scan from the top of the contour to the topmost darkened pixel in the column, and the second distance is determined based on a second scan from the bottom of the contour to the bottommost darkened pixel in the column. The purpose of this scanning method is to programmatically determine an imaginary vertical line that separates characters composing the ligature. That imaginary vertical line is determined when scanning, for example, from left to right, an end to a decreasing slope of pixels to a beginning of an increasing slope of pixels. The center point or column in transition of slopes from decreasing to increasing identifies the column and imaginary vertical line separating characters composing the ligature. A ligature could be composed of more than two characters, in which case, there will be multiple transition of slopes, multiple imaginary vertical lines separating all the characters composing the ligature. Further, the pinch point may be identified upon determining (i) a decrease in height of the respective glyph from a first column to a second column and (ii) an increase in height of the respective glyph from a second column to a third column. Further, the ligature processing engine 12 may also be configured to store, in the memory database 20, a height of a glyph in a previously scanned column upon determining that there's a change in height of the glyph from the previously scanned column to another glyph in a currently scanned column. Further, according to an embodiment, the OCR engine 13 may be configured to receive the separated characters from the ligature processing engine 12 and verify the accuracy of the separated characters. In particular, the OCR engine 13 may utilize machine learning to verify that the separated characters correspond to actual characters. For example, by training the OCR engine 13 on what the characters should actually look like, the OCR engine 13 is able to compare the separated characters to the trained characters and determine if there is a match. In particular, a convolutional neural network model has been trained with character data extracted in raster image format from document images containing text and labelled accordingly. Character data in raster image format is extracted from real documents and normalized to match the model (e.g., 25×25 pixels, binarized) and passed into the model for prediction. The character data can be extracted from ligature contours or normal character contours.

Figure 2A:
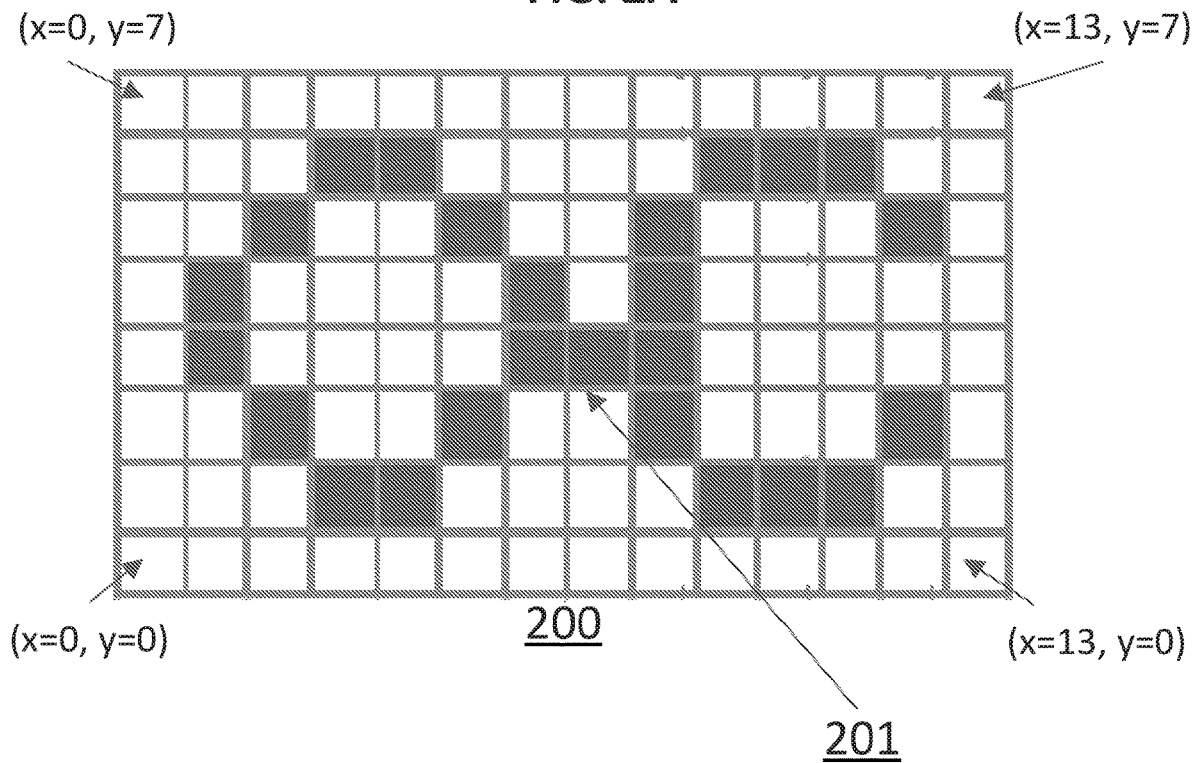
FIG. 2A illustrates an example embodiment of a contour including a ligature.

FIG. 2A illustrates an example embodiment of a contour including a ligature. According to an embodiment, as depicted in the figure, a contour 200 includes a ligature 201 composed of the characters "0" and "C." The contour 200 is composed of a plurality of pixel cells, wherein only those pixel cells associated with the ligature 201 are darkened. Further, the contour 200 is associated with a height of eight pixel cells and a width of fourteen pixel cells. Further, the contour 200 is associated with an x-y coordinate system, wherein the bottom left corner is associated with coordinates x=0, y=0, and the top right corner is associated with coordinates x=13, y=7.

Figure 2B:
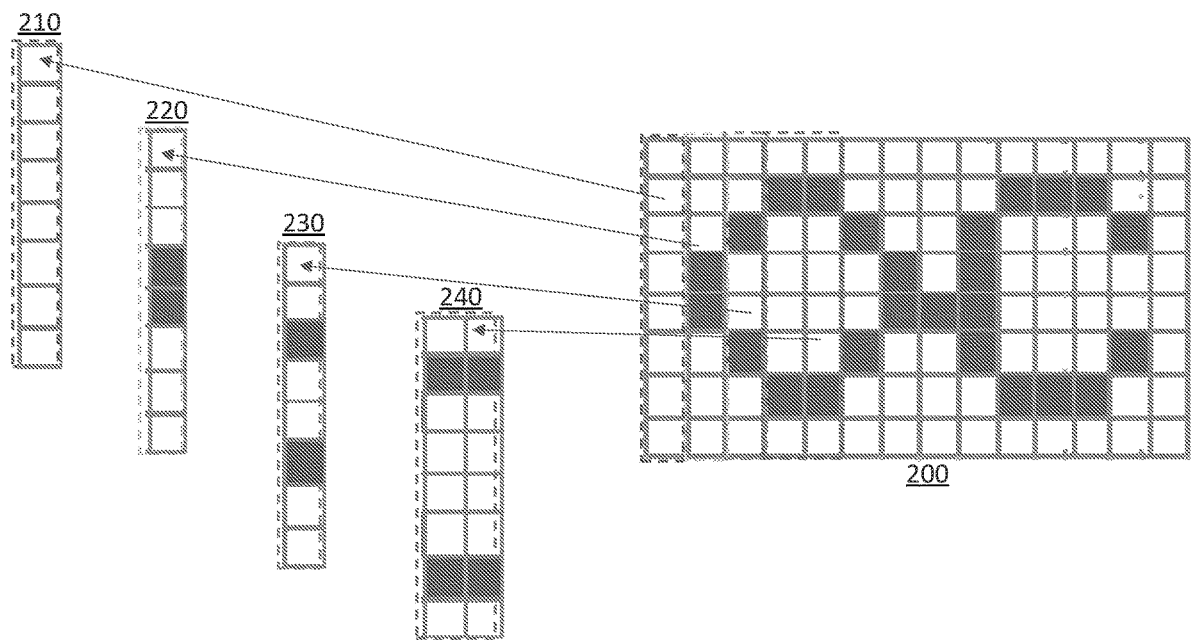
FIG. 2B illustrates an example embodiment of the scanned columns in the contour depicted in FIG. 2A.
Figure 2C:
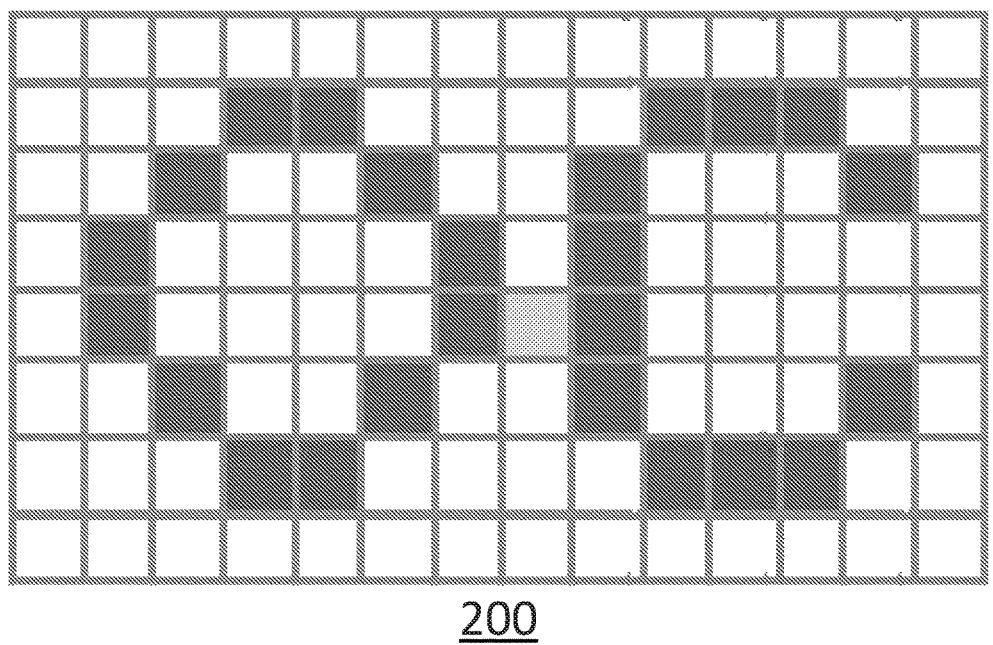
FIG. 2C illustrates an example embodiment of the contour depicted in FIG. 2A with the pinch point removed.
Figure 2D:
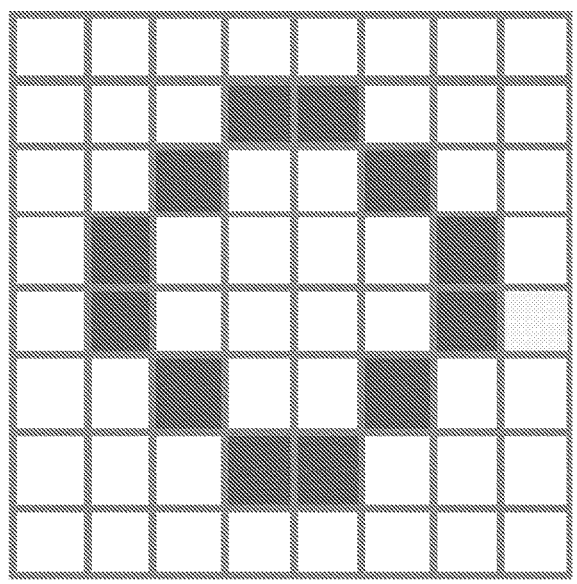
FIG. 2D illustrates an example embodiment of the contour depicted in FIG. 2A separated into separate contours.
Figure 2D:
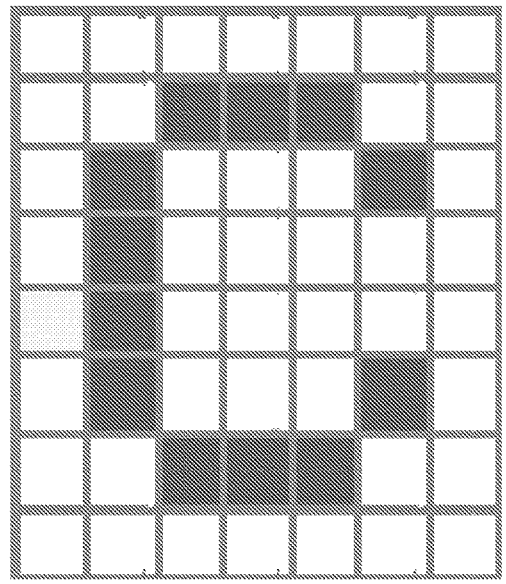

FIG. 2B illustrates an example embodiment of the scanned columns in the contour depicted in FIG. 2A. According to an embodiment, columns 210, 220, 230, and 240 may be scanned by the ligature processing engine 12. Column 210 is associated with the column for x=0, column 220 is associated with the column for x=1, column 230 is associated with the column for x=2, and column 240 is associated with the columns x=3 and x=4. According to an embodiment, columns 210, 220, 230, and 240 may be scanned from left to right. Starting with column 210, a glyph height is determined for each column during the scanning process. With regard to column 210, because there are no pixels in this column, the glyph height is zero. With regard to column 220, two pixels are darkened, indicating the start of the ligature as well as a glyph height of two. As stated above, the ligature processing engine 12 determines the glyph height of the column by scanning from the top and bottom of column until it finds darkened pixels. Here, by scanning from the top and bottom of the column 220, it can be determined that there are darkened pixels located at y=3 and y=4. Then, by measuring the distance between the darkened pixels, it can be determined that the glyph for column 220 is two. Similarly, with regard to column 230, it can be determined that the glyph height is four, thereby indicating an increase from the previous column, i.e., column 220. Further, because there was a height increase from the previous column, the ligature processing engine 12 stores the glyph height for the column 220 in the memory database 20. Similarly, with regard to column 240, it can be determined that the glyph height for x=3 is six, thereby indicating an increase from the previous column, i.e., column 230. As such, the ligature processing engine 12 stores the glyph height for the column 230 in the memory database 20. Similarly, the glyph height for x=4 is also six, thereby indicating no increase from the previous column, i.e., x=3. As such, the ligature processing engine 12 does not store the glyph height for the column x=3 in the memory database 20 and instead proceed to scanning the next column, i.e., x=5. As depicted in the figure, the glyph height decreases to four for the column x=5. Accordingly, the ligature processing engine 12 will store the glyph height for the column x=4 in the memory database 20. Similarly, with regard to the column x=6, the glyph height decreases to a glyph height of two, thereby causing the ligature processing engine 12 to store the glyph height for the column x=5 in the memory database 20. Then, with regard to the column x=7, the glyph height decreases to a glyph height of one, thereby causing the ligature processing engine 12 to store the glyph height for the column x=6 in the memory database 20. With regard to column x=8, however, the glyph height increases to four. As such, the ligature processing engine 12 stores the glyph height for the column x=7 in the memory database 20. Further, because there was a decrease in height from the column x=6 to the column x=7, and then an increase in height from the column x=7 to the column x=8, the column x=7 can be identified as including the pinch point. In particular, the pinch point is located at x=7, y=3. According to an embodiment, the ligature processing engine 12 then stores the pinch point location at the memory database 20. After the ligature processing engine 12 identifies the pinch point, the scanning could cease. The ligature processing engine 12 may then remove the glyph associated with the identified pinch point as depicted in FIG. 2C. After which, the ligature processing engine 12 may then separate the contour 200 into two separate contours 200a and 200b as depicted in FIG. 2D. In particular, the contour 200 may be vertically sliced (i.e., segmented) into two separate contours along the identified pinch point. According to an embodiment, the separated contours 200a and 200b may be associated with the characters originally forming the ligature. For example, the contour 200a may be associated with the character "0," while the contour 200b may be associated with the character "C." After they're separated, the characters may then be fed to the OCR engine 13 to verify their respective accuracy.

Figure 3:
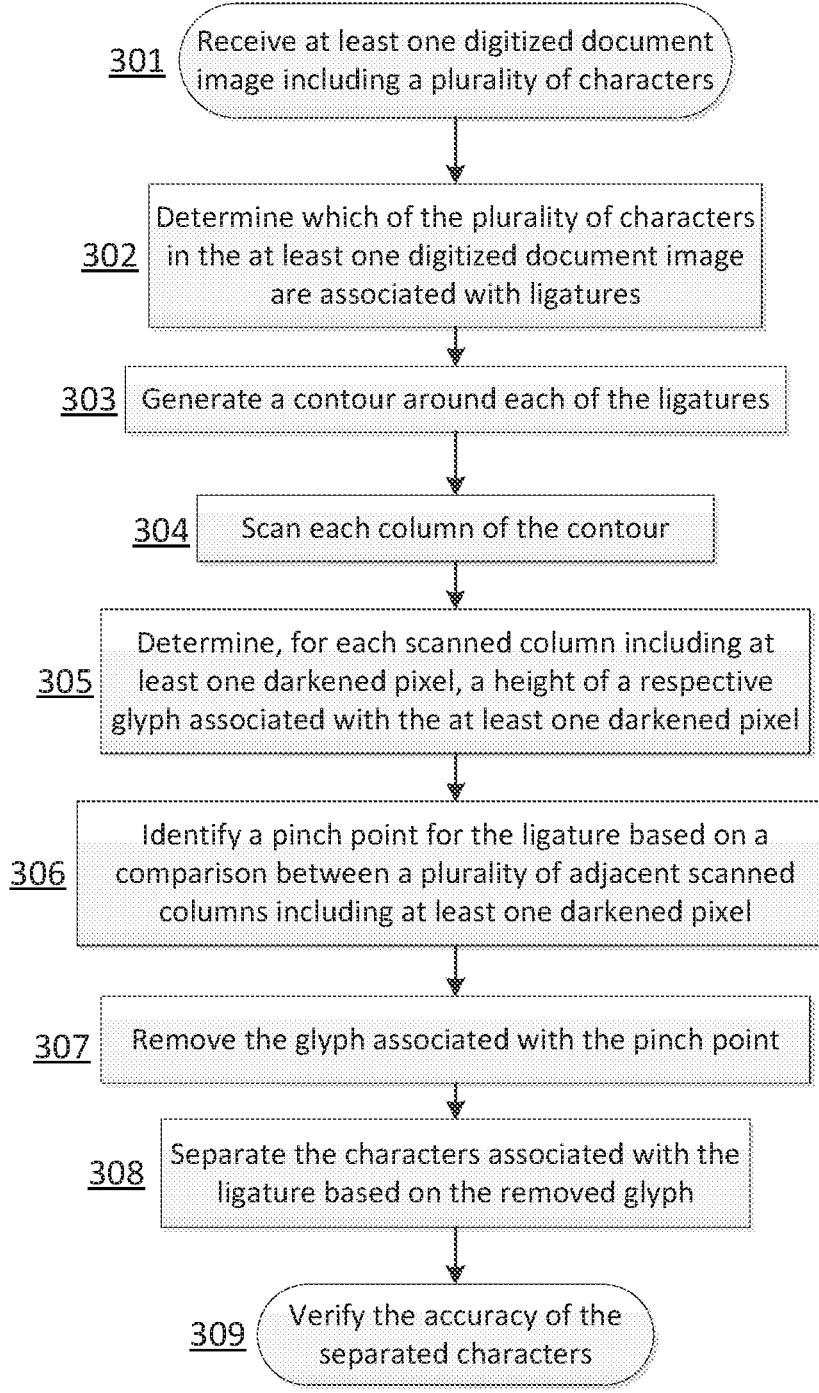
FIG. 3 illustrates an example embodiment of a method for separating characters associated with ligatures in digitized document images.

FIG. 3 illustrates an example embodiment of a method for separating characters associated with ligatures in digitized document images. As depicted in the figure, in a first step 301, at least one digitized document including a plurality of characters is received by the ligature detection engine 11. Then, in step 302, the ligature detection engine 11 determines which of the plurality of characters in the at least one digitized document are associated with ligatures. Then, in step 303, the ligature detection engine 11 generates a contour around each of the ligatures. According to an embodiment, the contour includes a pixelated version of the ligature, wherein pixels associated with glyphs of the ligature are darkened. Then, in step 304, the ligature processing engine 12 receives each of generated contours from the ligature detection engine 11 and then scans the columns of each contour. Further, according to an embodiment, the contours may be processed in parallel. Then, in step 305, the ligature processing engine 12 determines, for each scanned column including at least one darkened pixel, a height of a respective glyph associated with the at least one darkened pixel. Then, in step 306, the ligature processing engine 12 identifies a pinch point for the ligature based on a comparison between a plurality of adjacent scanned columns including at least one darkened pixel. Then, in step 307, the ligature processing engine 12 removes the glyph associated with the pinch point. Then, in step 308, the ligature processing engine 12 separates the characters associated with the ligature based on the removed glyph. Lastly, in step 309, the OCR engine 13 receives the separated characters from the ligature processing engine 12 and then verifies the accuracy of the separated characters.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

In the foregoing Description of Embodiments, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of Embodiments, with each claim standing on its own as a separate embodiment of the invention.

Moreover, it will be apparent to those skilled in the art from consideration of the specification and practice of the present disclosure that various modifications and variations can be made to the disclosed systems without departing from the scope of the disclosure, as claimed. Thus, it is intended that the specification and examples be considered as exemplary only, with a true scope of the present disclosure being indicated by the following claims and their equivalents.

The invention claimed is:

1. A character separation system, the system comprising one or more processors configured to:
   detect one or more ligatures based on a comparison of a width of one or more contours in pixels exceeds a maximum wide character in a proportional font;
   determine which of a plurality of characters in a digitized document image are associated with the one or more ligatures;
   generate a contour around each of the one or more ligatures, wherein the contour includes a pixelated version of the ligature, wherein pixels associated with glyphs of the ligature are darkened;
   determine, for each scanned column of the contour including one or more darkened pixels, a height of a respective glyph associated with the one or more darkened pixels by scanning the column, wherein:
      the height of the respective glyph is determined based on:
         a first distance from a top of the contour to a topmost darkened pixel in the column determined by a first scan from the top of the contour to the topmost darkened pixel in the column, and
         a second distance from a bottom of the contour to a bottommost darkened pixel in the column determined by a second scan from the bottom of the contour to the bottommost darkened pixel in the column, and
      the scanning determines an imaginary vertical line so as to separate one or more characters composing the ligature, the imaginary vertical line based on a transition that defines a change in slope between columns comprising an end to a decreasing slope of pixels to a beginning of an increasing slope;
   identify a pinch point for the ligature based on the imaginary vertical line;
   remove the glyph associated with the pinch point; and
   separate the one or more characters associated with the ligature.

2. The character separation system of claim 1, wherein the one or more processors are further configured to verify accuracy of the separated one or more characters.

3. The character separation system of claim 1, wherein the contour includes (i) a height of the ligature and (ii) a width of the ligature.

4. The character separation system of claim 1, wherein the one or more processors are configured to generate separate contours by slicing the contour in a vertical direction at the identified pinch point.

5. The character separation system of claim 1, wherein a plurality of imaginary vertical lines are configured to separate three or more characters composing the ligature.

6. The character separation system of claim 1, wherein the one or more processors are configured to store the height of the glyph in a first scanned column based on a determination indicative of a change in height of the glyph from the first scanned column to a height of another glyph in a second scanned column.

7. The character separation system of claim 1, wherein the one or more processors are configured to prevent storage of the height of the glyph based on a determination indicative of zero change in a height of the glyph from a first scanned column to a height of another glyph in a second scanned column.

8. The character separation system of claim 1, wherein a first separated contour is associated with a first character composing the ligature and a second separated contour is associated with a second character composing the ligature.

9. A method for character separation, the method comprising:
   detecting, by one or more processors, one or more ligatures based on a comparison of a width of one or more contours in pixels exceeds a maximum wide character in a proportional font;
   determining, by the one or more processors, which of a plurality of characters in a digitized document image are associated with the one or more ligatures;
   generating, by the one or more processors, a contour around each of the one or more ligatures, wherein the contour includes a pixelated version of the ligature, wherein pixels associated with glyphs of the ligature are darkened; and
   determining, by the one or more processors, for each scanned column of the contour including one or more darkened pixels, a height of a respective glyph associated with the one or more darkened pixels by scanning the column, wherein:
      the height of the respective glyph is determined based on:
         a first distance from a top of the contour to a topmost darkened pixel in the column determined by a first scan from the top of the contour to the topmost darkened pixel in the column, and
         a second distance from a bottom of the contour to a bottommost darkened pixel in the column determined by a second scan from the bottom of the contour to the bottommost darkened pixel in the column, and
      the scanning determines an imaginary vertical line so as to separate one or more characters composing the ligature, the imaginary vertical line based on a transition that defines a change in slope between columns comprising an end to a decreasing slope of pixels to a beginning of an increasing slope;
   identifying, by the one or more processors, a pinch point for the ligature based on the imaginary vertical line;
   removing, by the one or more processors, the glyph associated with the pinch point; and separating, by the one or more processors, the one or more characters associated with the ligature.

10. The method of claim 9, further comprising verifying, by the one or more processors, accuracy of the separated one or more characters.

11. The method of claim 9, further comprising detecting, by the one or more processors, the ligature based on evaluation of a dimension of the contour with respect to a threshold.

12. The method of claim 9, further comprising generating, by the one or more processors, separate contours by slicing the contour in a vertical direction at the identified pinch point.

13. The method of claim 9, wherein the contour includes (i) a height of the ligature and (ii) a width of the ligature.

14. The method of claim 9, wherein a plurality of imaginary vertical lines are configured to separate three or more characters composing the ligature.

15. The method of claim 9, further comprising:
storing, by the one or more processors, the height of the glyph in a first scanned column based on a determination indicative of a change in height of the glyph from the first scanned column to a height of another glyph in a second scanned column.

16. The method of claim 12, wherein a first separated contour is associated with a first character composing the ligature and a second separated contour is associated with a second character composing the ligature.

17. A computer readable non-transitory medium comprising computer-executable instructions that are executed on a processor and comprising the steps of:
detect one or more ligatures based on a comparison of a width of one or more contours in pixels exceeds a maximum wide character in a proportional font;
determine which of a plurality of characters in a digitized document image are associated with the one or more ligatures;
generate a contour around each of the one or more ligatures, wherein the contour includes a pixelated version of the ligature, wherein pixels associated with glyphs of the ligature are darkened;
determine, for each scanned column of the contour including one or more darkened pixels, a height of a respective glyph associated with the one or more darkened pixels by scanning the column, wherein:
the height of the respective glyph is determined based on:
a first distance from a top of the contour to a topmost darkened pixel in the column determined by a first scan from the top of the contour to the topmost darkened pixel in the column, and
a second distance from a bottom of the contour to a bottommost darkened pixel in the column determined by a second scan from the bottom of the contour to the bottommost darkened pixel in the column, and
the scanning determines an imaginary vertical line so as to separate one or more characters composing the ligature, the imaginary vertical line based on a transition that defines a change in slope between columns comprising an end to a decreasing slope of pixels to a beginning of an increasing slope;
identify a pinch point for the ligature based on the imaginary vertical line;
remove the glyph associated with the pinch point; and
separate the one or more characters associated with the ligature.

18. The character separation system of claim 2, wherein the one or more processors are further configured to verify the accuracy of the separated one or more characters by applying a machine learning model to compare the one or more separated characters to one or more trained characters.

19. The character separation system of claim 18, wherein:
the machine learning model comprises a convolutional neural network model, and
the machine learning model has been trained with character data extracted in raster image format from labelled document images.

20. The character separation system of claim 19, wherein:
the character data is extracted in raster image format, and
the character data is normalized to match the machine learning model.

* * * * *